Figure 1:
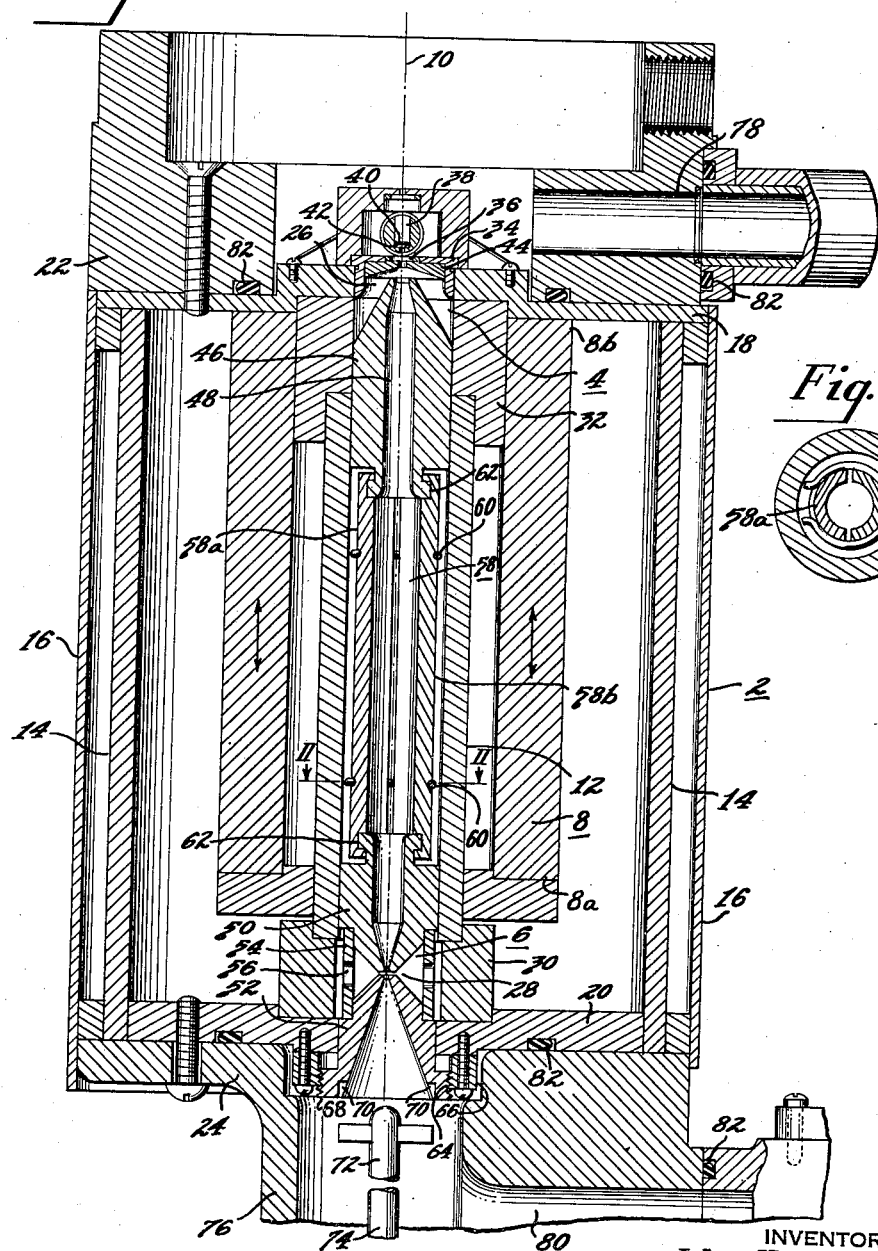

June 7, 1949.

J. H. REISNER 2,472,315

VARYING THE GAP SPACING OF POLE PIECES FOR
ELECTRON OPTICAL APPARATUS
Filed March 30, 1948

INVENTOR
John H. Reisner
BY
ATTORNEY

Patented June 7, 1949

2,472,315

UNITED STATES PATENT OFFICE 2,472,315

VARYING THE GAP SPACING OF POLE PIECES FOR ELECTRON OPTICAL APPARATUS

John H. Reisner, Collingswood, N. J., assignor to Radio Corporation of America, a corporation of Delaware Application March 30, 1948, Serial No. 17,846

8 Claims. (Cl. 250—49.5)

1

This invention relates generally to electron optical apparatus, and more particularly to a compound pole piece assembly for an electron lens system and to an improved method and means for adjusting the spacing of one of the gaps between the pole pieces of one of the lenses.

It has been shown, previously, that the focal length or strength of a magntic electron lens may be changed considerably by varying the spacing of the gap between the pole pieces of the lens. This has been described in United States Patent 2,413,432 of Perry C. Smith. In an electromagnetic lens system, however, the need for changing the strength of one of the lenses by means of varying the gap spacing is not so great since the field strength of the lens may be varied over a fairly wide range by varying the potential on the field coils. However, electromagnetic lenses are often, now, provided with removable spacing plates for varying the gap width. From one standpoint, this is objectionable since each time an adjustment of the gap width is made, the entire pole piece assembly, of the electron microscope or other electron optical apparatus, must be disassembled from the instrument with which it is associated and taken apart to exchange spacing plates.

In a permanent magnet lens, the field strength of the lens cannot be varied much, although coils may be placed around the magnet components to vary the strength to some extent. Because it is not always possible to vary the field strength of a permanent magnet lens sufficiently to change the focusing to a desirable extent over wide ranges of voltage and, since it is desirable in any event to omit coils around the magnets to avoid undue complication of design, focusing has previously been accomplished in a multiple lens system, such as described in copending application, Serial Number 704,089, of John H. Reisner, filed October 18, 1946, by moving the whole assembly as a unit axially along the path of the electron beam in order to vary the spacing between the objective lens and the specimen. This method of varying the focusing of a lens system is described in the book "Electron Optics and the Electron Microscope," by Zworykin et al., page 184. Such a system is a fixed focus system (since the pole piece gaps are fixed in width) and is not applicable where the specimen holders prevent sufficiently close approach to the sample to utilize the full extent of the available focal length. Accordingly, it is a principal object of the present invention to provide means for varying the gap width of one of the lenses of a permanent magnet lens system

2 without varying the strength of other lenses in the system and without varying the distance between the entrance pole piece of the objective lens and the specimen holder.

Another object of the invention is to provide a method and apparatus for adjusting the gap spacing of one of the lenses in a permanent magnet lens system by motion imparted through another lens of the system.

Another object of the invention is to provide an apparatus for varying the gap spacing of the pole pieces forming the objective lens in an electron microscope without introducing any motion-imparting apparatus in the vicinity of the specimen chamber where very close tolerances prevail, where the entrance pole piece of the objective lens provides a reference point for both the objective and condenser apertures and where the specimen handling mechanism and aperture aligning mechanism take up all the space.

Another object of the invention is to provide a simple, low cost apparatus for varying the gap spacing of the pole pieces of a permanent magnet electron lens without disassembling the lens from the electron optical apparatus with which it is associated.

Another object of the invention is to provide a means and method for varying the spacing between the pole pieces of a magnetic electron lens, positioned in one part of an electron optical system, by motion imparted through a part remote thereto.

Figure 2:
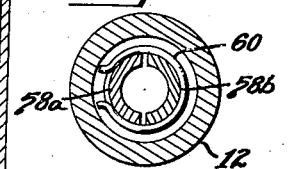

These and other objects will be more apparent and the invention will be more readily understood from a study of the specification, including the drawings, of which:

Figure 1 is an elevation view, partially in longitudinal section, of one embodiment of apparatus constructed in accordance with the present invention, and Figure 2 is a horizontal cross section of a linking member, shown in Figure 1, taken along the line II—II.

Referring now to Figure 1, there is shown one modification of a system in which the apparatus of the present invention may be used. The apparatus constitutes a permanent magnet electron lens system 2 having an objective lens indicated generally at 4 and a projector lens 6, which system is adapted to be used with an electron microscope. It is understood that the modification shown is only one of many which could be illustrated. For example, a pole piece assembly, constructed according to the present invention, could be used in any of the double gap systems shown in the aforementioned co-pending application, Serial Number 704,089, of John H. Reisner, filed October 18, 1946, or in any multiple gap system. In Figure 1, the electron lens system 2 is more particularly shown as including a cylindrical permanent magnet 8, which is energized in a direction parallel to the path of travel of the electron beam 10 being acted upon by the lens system. This cylindrical permanent magnet has its ends 8a and 8b as poles. To one of the ends 8a, there is connected an inner concentric cylinder 12, of magnetically permeable material, having low retentivity, which may be of soft iron or cold rolled steel. The cylindrical magnet, itself, may be of a material capable of being strongly magnetized, such as an alloy of aluminum, cobalt, iron and nickel. The inner concentric cylinder 12 serves as a flux path to the air gap associated with the objective lens 4. To the opposite pole of the cylindrical magnet, there is connected an outer concentric shield 14 of magnetically permeable material, similar to that of the inner concentric cylinder 12, which shield also serves as a path for conducting magnetic flux from one of the poles of the magnet to the air gap of the projector lens 6. Surrounding the outer concentric cylinder 14 and separated from it by a narrow air gap, there may also be placed a second concentric shielding member 16, which substantially eliminates the effects of minor stray fields within the lens assembly from being led into the surrounding atmosphere.

At the objective and projector ends of the lens system assembly, there are provided end members 18 and 20, respectively, of magnetically permeable material, serving partly as shielding means and also as part of the flux paths. Further end mounting members 22 and 24, which may or may not be of magnetically permeable material, are also provided for the objective and projector ends, respectively, of the lens assembly in order to provide greater strength of construction and to serve as means of attachment for various elements of the electron optical system, with which the present invention is not concerned.

In the lens system illustrated, the flux gap of the objective lens is indicated at 26 and the flux gap of the projector lens is indicated at 28. A brass spacing ring 30 is provided between the end member 20 and one end of the inner concentric cylinder 12 to aid in mounting the pole pieces of the projector lens and another brass spacing ring 32 is also provided between the other end member 18 and the other end of the inner cylinder 12 to aid in mounting the pole pieces of the objective lens. Both of these spacing rings are provided with channeled portions, into which the ends of the inner cylinder 12 are snugly fitted.

The objective lens has a fixed entrance pole piece 34 having an aperture 36 for the passage of the electron beam 10 which passes through the system from a source not shown. Before passing through the aperture, the electron beam first passes through the specimen chamber 38 and strikes the specimen 40, which may be placed on the specimen holder 42. The aperture 36 is provided with an aperture support 44, which is of non-magnetically permeable material, such as brass or aluminum. The objective lens is also provided with a movable exit pole piece 46, which has a centrally bored cylindrical channel 48 for the passage of the electron beam. Since the exit pole piece 46 is movable, the gap between it and the entrance pole piece 34 may be varied. The aperture support 44 limits the minimum distance of approach between the two pole pieces of the objective lens pair.

The projector lens is also provided with two pole pieces 50 and 52, each of which is provided with a central cylindrical channel for the passage of the electron beam. A brass spacing ring 54 is fitted tightly over the opposing ends of the two pole pieces 50 and 52 of the objective lens 4, which ring, at the same time, establishes the spacing between the pole pieces and also holds the two pole pieces in a constant position with respect to each other so that, when they are moved, they are moved as a unit. The brass spacing ring 54 may be provided with apertures 56 to facilitate cleaning. If it is desired to vary the spacing between the pole pieces 50 and 52, spacing rings of different longitudinal thicknesses may be substituted.

For the purpose of connecting together the movable exit pole piece 46 of the objective lens 4 and the entrance pole piece 50 of the projector lens 6, a linking member 58 may be provided. This linking member comprises a split cylinder having two halves 58a and 58b, which halves are held in position by snap rings 60. The inner surface of the split cylinder 58 is channeled near each end in order to fit snugly over machined boss portions 62 of each of the pole pieces which it joins together. Although, obviously, other forms of linking members could be used, such as a tube having threaded ends for connecting to similarly threaded boss portions of the pole pieces, the form of linking member used has some particular advantages. It provides enough flexibility so that the pole pieces and the apertures may be easily aligned one with another after being placed within the inner concentric cylinder 12.

The entire unit, comprising the movable exit pole piece 46 of the objective lens 4, the entrance and exit pole pieces 50 and 52 of the projector lens 6, the spacing ring 54 and the split cylinder 58, is mounted for slideable, longitudinal, axial movement with respect to the electron beam within the inner concentric cylinder 12, forming part of the flux path of the lens system. In order to control accurately the extent of movement of the pole piece unit, there is provided a threaded part 64 of the outer cylindrical surface of the exit pole piece 52 of the projector lens 6, which threaded part is mounted within a similarly threaded collar 66, which is bolted to the end shielding member 20 of the projecting end of the lens system. To enable the pole piece 52 and, of course, the entire unit to be rotated upon the threads, a simple mechanism has been provided. The outer end face 68 of the exit pole piece 52 of the projector lens 6 is provided with a slot 70 into which may be fitted a key 72. The key may be provided with a handle 74, which is turned by the operator. The length of the handle will be dependent upon the length of the instrument barrel 76 through which the handle must be inserted in order for the key to engage the slot. It will be obvious that other forms of mechanism for moving the pole piece unit back and forth within the inner concentric cylinder 12 may be used without departing from the spirit of the invention. For example, a crank could be permanently inserted through the wall of the instrument with an air-tight seal, and a keying mechanism could be provided on the end of the crank for moving the pole piece unit.

With a pole piece assembly, such as above described, the gap between the pole pieces of the objective lens may be varied, as desired. As previously pointed out, this adjustment can be used to focus the objective lens, since changing the gap changes the strength of the lens. As also previously pointed out, this results in considerable advantage in the operation of the instrument. Without changing the strength of the projector lens, the strength of the objective lens may be varied in a simple manner. This form of focusing is much to be desired over the former method of moving the entire pole piece assembly, including the entrance pole piece of the objective lens, and thus varying the distance between the entrance pole piece of the objective lens and the specimen. In the present invention, the projector pole piece always straddles the projector pole piece gap so that the strength of the lens is unchanged, even though the assembly is moved back and forth with respect thereto.

The entire lens and pole piece assembly is adapted to be a part of the column of an electron microscope. In use, this column is, of course, highly evacuated. The cylindrically channeled members 78 and 80 are connected to the exhaust manifold (not shown), which, in turn, is connected to a vacuum pump (not shown) for pumping down the system. Sealing gaskets 82 are also provided between the various members to prevent air contamination due to the atmosphere leaking in between their machined faces.

There has thus been described a pole piece assembly for magnetic electron lens systems of the multiple gap type in which there is provided improved means and method for varying the gap spacing of one of the lenses without affecting the strength of any other lens of the system. Although especially useful for permanent magnet lens systems, it may also be used with electromagnetic electron lens system. Although a single embodiment of the invention has been shown, various modifications may be made without departing from the spirit of the invention and it is intended that the scope of the invention be limited only by the scope of the appended claims.

I claim as my invention:

1. In an electron optical system which includes a pair of magnetic electron lenses, a first pair of pole pieces providing a fixed gap for one of said lenses and a second pair of pole pieces providing a variable gap for the other of said lenses and means for changing the strength of said other lens by varying said variable gap without changing the strength of said first mentioned lens.

2. A system according to claim 1 in which said lens having the fixed gap is a projector lens and said lens having the variable gap is an objective lens.

3. A system according to claim 2 including means operable through said projector lens for varying the strength of said objective lens.

4. In a magnetic double lens electron optical system comprising a projector lens and an objective lens, a compound pole piece assembly which includes a first pair of pole pieces having a fixed gap for one of said lenses and a second pair of pole pieces having a variable gap for the other of said lenses, one of the pole piece components of said second pair being fixed and the other pole piece of said second pair being axially movable with respect thereto whereby the flux gap therebetween may be varied, a linking member fixedly joining said first pole piece pair to the movable pole piece of said second pair to form a unit which is mounted for axial movement within said system, means associated with said first pole piece pair for enabling movement to be imparted thereto and means engageable with said movement imparting means for imparting said movement.

5. Apparatus according to claim 4 in which said movement enabling means is a slot and said movement imparting means is a removable key adapted to be operated from a position external to said apparatus.

6. In a magnetic double lens electron optical system comprising a projector lens and an objective lens, a compound pole piece assembly which includes a first pair of pole pieces having a fixed gap for one of said lenses and a second pair of pole pieces having a variable gap for the other of said lenses, one of the pole piece components of said second pair being fixed and the other pole piece of said second pair being movable with respect thereto whereby the flux gap may be varied, means joining said first pole piece pair to the movable piece of said second pair to form a unit which is mounted for axial movement within said system, and means operable through said first pair for moving said unit axially with respect to said fixed pole piece component.

7. A method of varying the pole piece gap of a first pole piece pair associated with one of the lenses of a compound magnetic electron lens system without varying the gaps of the other lenses of said system comprising imparting motion to a movable pole piece of said first pole piece pair by transmitting said motion through another pole piece pair while maintaining the spacing of said another pair constant.

8. In an electron optical apparatus including a permanent magnet double lens system comprising a projector lens and an objective lens, a compound pole piece assembly which includes a first pair of pole pieces having a fixed gap for one of said lenses and a second pair of pole pieces having a variable gap for the other of said lenses, a specimen holder, a pole piece of said second pair positioned fixedly with respect to said specimen holder, another pole piece of said second pair axially movable with respect thereto, means joining said first pole piece pair to the movable pole piece of said second pair to form a unit which is mounted for axial movement within said lens system, and means for imparting axial movement to said unit.

JOHN H. REISNER.

No references cited